(12) United States Patent
Wang et al.

(10) Patent No.: US 11,929,953 B2
(45) Date of Patent: *Mar. 12, 2024

(54) TRANSMITTING APPARATUS, RECEIVING APPARATUS AND METHODS THEREOF

(71) Applicant: Panasonic Intellectual Property Corporation of America, Torrance, CA (US)

(72) Inventors: Lilei Wang, Beijing (CN); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/176,998

(22) Filed: Mar. 1, 2023

(65) Prior Publication Data

US 2023/0208596 A1 Jun. 29, 2023

Related U.S. Application Data

(63) Continuation of application No. 17/256,108, filed as application No. PCT/CN2018/113523 on Nov. 1, 2018, now Pat. No. 11,632,215.

(51) Int. Cl.
*H04L 5/00* (2006.01)
*H04W 4/40* (2018.01)

(52) U.S. Cl.
CPC ............ *H04L 5/0051* (2013.01); *H04W 4/40* (2018.02)

(58) Field of Classification Search
CPC ............................ H04L 5/0051; H04W 4/40
See application file for complete search history.

(56) References Cited

U.S. PATENT DOCUMENTS 10,103,854 B2 10/2018 Nakashima et al.
2018/0048446 A1 2/2018 Jiang et al.
(Continued)

FOREIGN PATENT DOCUMENTS

WO WO 2011009371 A1 1/2011

OTHER PUBLICATIONS

Ericsson, "Physical layer structures of NR V2X," Tdoc R1-1811592, Agenda Item: 7.2.4.1.2, 3GPP TSG-RAN WG1 Meeting #94 bis, Chengdu, China, Oct. 8-12, 2018. (14 pages).

(Continued)

*Primary Examiner* — Shukri Taha
(74) *Attorney, Agent, or Firm* — Seed IP Law Group LLP

(57) ABSTRACT

Provided are a transmitting apparatus, a receiving apparatus and methods thereof. The transmitting apparatus includes: circuitry, which, in operation, generates a signal including a first type of reference signal used for demodulation and a second type of reference signal used for demodulation; and a transmitter, which, in operation, transmits the signal, wherein the first type of reference signal used for demodulation is mapped to a first resource, and the second type of reference signal used for demodulation is mapped to a second resource, the first type of reference signal used for demodulation is used for a first physical control channel and the second type of reference signal used for demodulation is used for a second physical control channel; or the first type of reference signal used for demodulation is used for PSCCH and the second type of reference signal used for demodulation is used for PSSCH.

12 Claims, 16 Drawing Sheets

▨ DMRS for the first physical control channel

▧ DMRS for the second physical control channel

■ the first physical control channel carrying UCI type1

▦ the second physical control channel carrying UCI type2

▤ PUSCH

(56) References Cited

U.S. PATENT DOCUMENTS

| | | | |
|---|---|---|---|
| 2018/0234220 A1 | 8/2018 | Yasukawa et al. | |
| 2019/0229964 A1 | 7/2019 | Ouchi et al. | |
| 2020/0067610 A1 | 2/2020 | Lee et al. | |
| 2020/0100237 A1 | 3/2020 | Chae et al. | |
| 2020/0252255 A1* | 8/2020 | Sorrentino | H04B 7/0456 |
| 2020/0359367 A1* | 11/2020 | Tang | G01S 5/0236 |
| 2021/0006443 A1 | 1/2021 | Morozov et al. | |
| 2021/0160026 A1 | 5/2021 | Wang et al. | |

OTHER PUBLICATIONS

Extended European Search Report, dated Oct. 7, 2021, for European Application No. 18938520.6-1205, 9 pages.
International Search Report, dated Jul 19, 2019, for corresponding International Application No. PCT/CN2018/113523, 2 pages.
LG Electronics, "Remaining details on DMRS for PSCCH and PSSCH," R1-166821, Agenda item: 7.2.2.1, 3GPP TSG RAN WG1 Meeting #86, Gothenburg, Sweden, Aug. 22-26, 2016. (3 pages).
MediaTek Inc., "On NR V2X Physical Channel Design Issues," R1-1808280, Agenda item: 7.2.4.1.2, 3GPP TSG RAN WG1 Meeting #94, Gothenburg, Sweden, Aug. 20-24, 2018. (6 pages).
OPPO, "Discussion of physical layer structure and procedure for NR-V2X," R1-1810985, Agenda Item: 7.2.4.1.2, 3GPP TSG RAN WG1 Meeting #94bis, Chengdu, China, Oct. 8-12, 2018. (8 pages).

* cited by examiner

⬚ DMRS for the first physical control channel

▨ DMRS for the second physical control channel

■ the first physical control channel carrying UCI type1

▦ the second physical control channel carrying UCI type2

▦ PUSCH

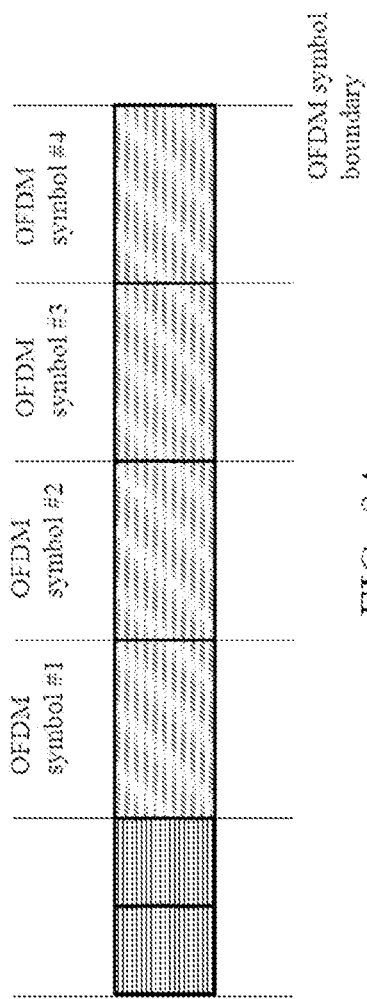
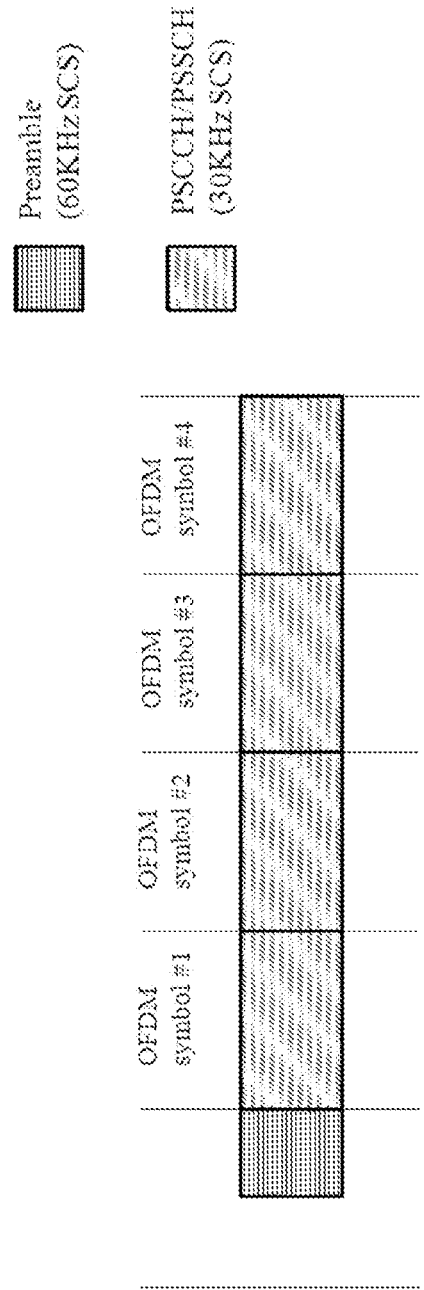
FIG. 9A
FIG. 9B

TRANSMITTING APPARATUS, RECEIVING APPARATUS AND METHODS THEREOF

BACKGROUND

1. Technical Field

The present disclosure relates to wireless communication field, and in particular, to a transmitting apparatus, a receiving apparatus and methods thereof related to a reference signal used for demodulation used in New Radio (NR).

2. Description of the Related Art 5G has been envisaged to expand and support diverse usage scenarios and applications with respect to current mobile network generations, among which Ultra-Reliable Low latency Communications (URLLC) scenario has become one of critical issues. In NR standard 3GPP Re1.15, basic functionality on URLLC has been specified for uplink.

On the other hand, for NR sidelink-based Vehicle to Everything (V2X), multiplexing of Physical Sidelink Control Channel (PSCCH) and Physical Sidelink Shared Channel (PSSCH) is being discussed.

SUMMARY

One non-limiting and exemplary embodiment facilitates a common design of a reference signal used for demodulation used in both NR URLLC scenario and NR V2X sidelink scenario.

In one general aspect of the present disclosure, there is provided a transmitting apparatus, comprising: circuitry, which, in operation, generates a signal including a first type of reference signal used for demodulation and a second type of reference signal used for demodulation; and a transmitter, which, in operation, transmits the signal, wherein the first type of reference signal used for demodulation is mapped to a first resource, and the second type of reference signal used for demodulation is mapped to a second resource, the first type of reference signal used for demodulation is used for a first physical control channel and the second type of reference signal used for demodulation is used for a second physical control channel; or the first type of reference signal used for demodulation is used for PSCCH and the second type of reference signal used for demodulation is used for PSSCH.

In another general aspect of the present disclosure, there is provided a receiving apparatus, comprising: a receiver, which, in operation, receives a signal including a first type of reference signal used for demodulation and a second type of reference signal used for demodulation; and circuitry, which, in operation, performs demodulation based on the first type of reference signal used for demodulation and the second type of reference signal used for demodulation, wherein the first type of reference signal used for demodulation is mapped to a first resource, and the second type of reference signal used for demodulation is mapped to a second resource, the first type of reference signal used for demodulation is used for a first physical control channel and the second type of reference signal used for demodulation is used for a second physical control channel; or the first type of reference signal used for demodulation is used for PSCCH and the second type of reference signal used for demodulation is used for PSSCH.

In another general aspect of the present disclosure, there is provided a transmitting method, comprising: generating a signal including a first type of reference signal used for demodulation and a second type of reference signal used for demodulation; and transmitting the signal, wherein the first type of reference signal used for demodulation is mapped to a first resource, and the second type of reference signal used for demodulation is mapped to a second resource, the first type of reference signal used for demodulation is used for a first physical control channel and the second type of reference signal used for demodulation is used for a second physical control channel; or the first type of reference signal used for demodulation is used for PSCCH and the second type of reference signal used for demodulation is used for PSSCH.

In another general aspect of the present disclosure, there is provided a receiving method, comprising: receiving a signal including a first type of reference signal used for demodulation and a second type of reference signal used for demodulation; and performing demodulation based on the first type of reference signal used for demodulation and the second type of reference signal used for demodulation, wherein the first type of reference signal used for demodulation is mapped to a first resource, and the second type of reference signal used for demodulation is mapped to a second resource, the first type of reference signal used for demodulation is used for a first physical control channel and the second type of reference signal used for demodulation is used for a second physical control channel; or the first type of reference signal used for demodulation is used for PSCCH and the second type of reference signal used for demodulation is used for PSSCH.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIGS. 9A and 9B schematically show an exemplary scenario of preamble in NR V2X sidelink scenario according to an embodiment of the present disclosure;

DETAILED DESCRIPTION

Figure 1:
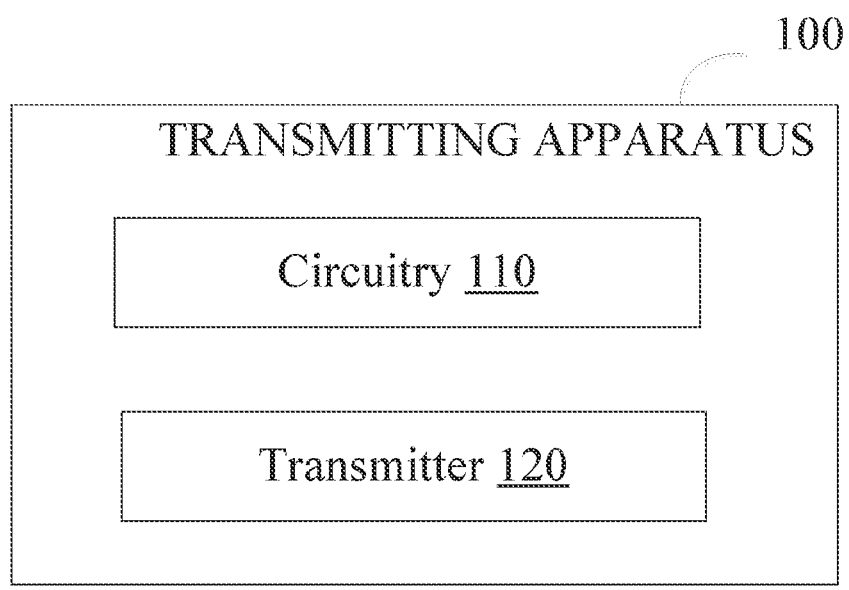
FIG. 1 illustrates a block diagram of a transmitting apparatus according to an embodiment of the present disclosure.

In the following detailed description, reference is made to the accompanying drawings, which form a part thereof. In the drawings, similar symbols typically identify similar components, unless context dictates otherwise. It will be understood that the aspects of the present disclosure can be arranged, substituted, combined, and designed in a wide variety of different configurations, all of which are explicitly contemplated and make part of this disclosure.

In an embodiment of the present disclosure, there is provided a transmitting apparatus as shown in FIG. 1. FIG. 1 illustrates a block diagram of a part of a transmitting apparatus 100 according to an embodiment of the present disclosure.

As shown in FIG. 1, the transmitting apparatus 100 may include circuitry 110 and a transmitter 120. It should be noted that, the circuitry 110 and the transmitter 120 disclosed in FIG. 1 are exemplary but not limited. That is, the transmitting apparatus 100 may include various other structural or functional elements, or variations of the elements recited in FIG. 1. For example, the transmitting apparatus 100 may further include a receiver. Alternatively, the transmitting apparatus 100 may include a transceiver instead of the transmitter 120.

The circuitry 120 may be operative to generate a signal including a first type of reference signal used for demodulation and a second type of reference signal used for demodulation, wherein the first type of reference signal used for demodulation is mapped to a first resource, and the second type of reference signal used for demodulation is mapped to a second resource. The first type of reference signal used for demodulation may be used for a first physical control channel, and the second type of reference signal used for demodulation may be used for a second physical control channel. Alternatively, the first type of reference signal used for demodulation may be used for PSCCH, and the second type of reference signal used for demodulation may be used for PSSCH. The transmitter 120 may be operative to transmit the above signal including the first type of reference signal used for demodulation and the second type of reference signal used for demodulation.

For example, in the following detailed description, the reference signal used for demodulation is described taking Demodulation Reference Signal (DMRS) as an example. It should be noted that, although the embodiments herein assume DMRS as the reference signal used for demodulation, the present disclosure is not limited thereto. The embodiments of the present disclosure are also applicable to any other kinds of reference signal used for demodulation.

In an embodiment, a first type of DMRS may be mapped to the first resource earlier than the second resource to which a second type of DMRS is mapped. In one example, the first type of DMRS is mapped in earlier symbol(s) and the second type of DMRS is mapped in later symbol(s) in the same Physical Resource Block (PRB). In another example, the first type of DMRS is mapped in earlier PRB(s) and the second type of DMRS is mapped in later PRB(s). It should be noted that, these two examples are for illustrative purposes, and the first resource and the second resource may be configured in other units according to design requirement.

In an embodiment, the first type of DMRS may differ from the second type of DMRS in at least one of: density, interval, number, generation sequence and antenna port for transmission. In one example, the density of the first type of DMRS is larger than that of the second type of DMRS in at least one of the frequency domain and the time domain. Alternatively, the density of the first type of DMRS is smaller than that of the second type of DMRS in at least one of the frequency domain and the time domain. In another example, the interval of the first type of DMRS is longer than that of the second type of DMRS in the time domain. Alternatively, the interval of the first type of DMRS is shorter than that of the second type of DMRS in the time domain. In another example, the number of the first type of DMRS is smaller than that of the second type of DMRS, for example, in one PRB or a plurality of PRBs. Alternatively, the number of the first type of DMRS is larger than that of the second type of DMRS. In another example, the generation sequence of the first type of DMRS is different from that of the second type of DMRS. In another example, the antenna port for transmission of the first type of DMRS is different from that of the second type of DMRS.

It should be noted that, above examples of the differences between the first type of DMRS and the second type of DMRS are only for illustrative purposes, and any other difference is also possible. Additionally, any combination of the above examples of the differences is also possible. For example, both generation sequence and density are different between the first type of DMRS and the second type of DMRS.

In an embodiment of the present disclosure, the transmitting apparatus 100 may be applied in NR URLLC scenario. In NR URLLC scenario, one of issues in NR standard 3GPP Re1.15 is that the transport block size is limited or fixed, for example 32 bytes, in case of Grant-Free uplink transmission.

However, using a fixed transport block size seems quite inefficient in certain application scenarios where large transport block size is needed or the size may vary largely. In this sense, a straightforward way is that a UE indicates a transport block size (or resource time/frequency position) to gNB in order to adapt different traffic in various application scenarios. The relevant control signaling used for such indication can be a new type of UCI (for example, called UCI type 1), which is different from a normal UCI (for example, called UCI type 2) carrying Channel State Information (CSI) or Hybrid Automatic Repeat request-Acknowledgement (HARQ-ACK).

In this embodiment, the first type of DMRS may be used for demodulation of the first physical control channel, and the second type of DMRS may be used for demodulation of the second physical control channel.

The first physical control channel carries the UCI type 1 described above, and the second physical control channel carries UCI type 2 described above. The UCI type 1 may be used to indicate PUSCH resource allocation, for example, resource size and position of the PUSCH. The UCI type 2 may be used to indicate CSI or HARQ-ACK.

In another embodiment, the second type of DMRS may be further used for demodulation of data in the PUSCH. The data in the PUSCH may be transmitted based on Type 1 Grant-Free uplink transmission or Type 2 Grant-Free uplink transmission. Type 1 Grant-Free uplink transmission may be dependent on Radio Resource Control (RRC) signaling configuration, which means that Modulation and Coding Scheme (MCS) and time/frequency resource are configured by RRC signaling, and thus there is no DCI used for activation/deactivation. Type 2 Grant-Free uplink transmission may be based on RRC signaling together with Layer 1 signaling, which means that some of MCS and time/frequency resource is configured by RRC signaling, and DCI is used for activation/deactivation.

Based on these two types of Grant-Free uplink transmission, it is possible for the gNB/UE not to transmit/receive dynamic control signaling for each packet. Instead, the UE directly transmits uplink traffic in those granted resources based on configured transmission parameters like MCS. Both of the latency and signaling overhead are reduced.

Figure 2A:
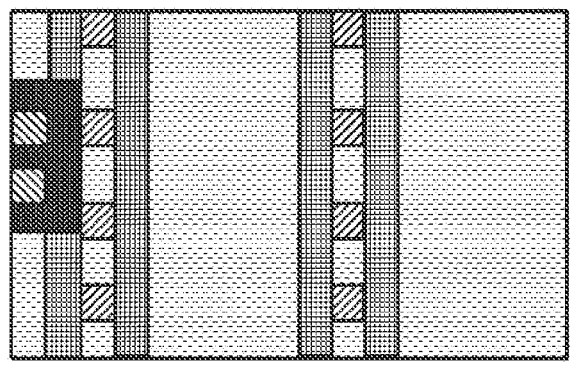
FIGS. 2A and 2B schematically show an exemplary configuration of first and second types of DMRS in NR URLLC scenario according to an embodiment of the present disclosure.

FIG. 2A schematically shows an exemplary configuration of the first and second types of DMRS in NR URLLC scenario according to an embodiment of the present disclosure. As shown in FIG. 2A, there may be a first physical control channel carrying UCI type 1, a second physical control channel carrying UCI type 2 and the PUSCH. Further, a first type of DMRS for the first physical control channel and a second type of DMRS for the second physical control channel may be configured.

In time domain, the starting position of the first physical control channel carrying UCI type 1 may be the same as that of the PUSCH, while the ending position of the first physical control channel carrying UCI type 1 may be earlier than that of the PUSCH. In frequency domain, the first physical control channel carrying UCI type 1 may occupy a part of subcarriers which are occupied by the PUSCH. On the other hand, some of resources as shown in FIG. 2A may be reserved for the first type of DMRS and the second type of DMRS respectively. For example, some of the resource occupied by first physical control channel may be punctured for mapping the first type of DMRS, and some of the resource occupied by the PUSCH may be punctured for mapping the second type of DMRS. Alternatively, other schemes are also available for reserving resources for the first and second types of DMRS, such as rate matching and the like.

As shown in FIG. 2A, the second type of DMRS may be mapped to the second resource later than the first resource to which the first type of DMRS is mapped. Further, the second physical control channel carrying UCI type 2 may be located around the second resource mapping the second type of DMRS.

It should be noted that the configurations of the first physical control channel, the second physical control channel, the PUSCH, the first type of DMRS and the second type of DMRS in time domain and frequency domain shown in FIG. 2A are only for illustrative purpose, and the present disclosure is not limited thereto.

In one example, all channels/signals may be transmitted within one PRB. The position of the time/frequency domain for the first physical control channel carrying UCI type 1 may be fixed, for example, located at first two symbols in a first slot of this PRB in the time domain and occupies around half PRB in the middle position of this PRB in the frequency domain. The first type of DMRS may be located at first symbol in the first slot of this PRB in the time domain, and occupies several (for example, two) separate subcarriers in the frequency domain. The second type of DMRS may occupy one symbol in each of the two slots of this PRB in the time domain, and occupy several (for example, four) separate subcarriers in the frequency domain. The second physical control channel carrying UCI type 2 may be located around the second type of DMRS and occupies two symbols in each of the two slots of this PRB in the time domain and occupies the same frequency band as the PUSCH.

According to an embodiment of the present disclosure, the first type of DMRS may be different from the second type of DMRS in terms of at least one of density, interval, number, generation sequence and antenna port for transmission. Following is a few examples of the difference between the first type of DMRS and the second type of DMRS.

Density: In frequency domain, for example, the first type of DMRS may be distributed per 2 subcarriers in a symbol, while the second type of DMRS may be distributed per 3 subcarriers in a symbol. In time domain, for example, the gap between two symbols having the first type of DMRSs may be two symbols, while the gap between two symbols having the second type of DMRSs may be four symbols.

Interval: The first type of DMRS (together with UCI type 1) may be transmitted, for example, per two slots (interval is two slots), while the second type of DMRS may be transmitted, for example, per slot (interval is one slot).

Number: For example, the first type of DMRS may have one port and support a single layer, while the second type of DMRS may have two ports and support spatial multiplexing (two layers or rank 2). In one PRB, the resource elements (REs) to transmit the first type of DMRS may be less than that of the second type of DMRS.

Generation Sequence: The first type of DMRS may use, for example, ZC sequence, while the second type of DMRS may use, for example, pseudo-random sequence.

Antenna Port for Transmission: For example, the first type of DMRS may use transmit diversity based MIMO scheme, while the second type of DMRS may use spatial multiplexing based MIMO scheme. The number of antenna port for transmission may also be different.

It should be noted that, above examples on the differences between the first type of DMRS and the second type of DMRS are only for illustrative purposes, and any other difference is also possible. Additionally, any combination of the above examples on the differences is also possible, for example both generation sequence and density are different between the first type of DMRS and the second type of DMRS.

Figure 2B:
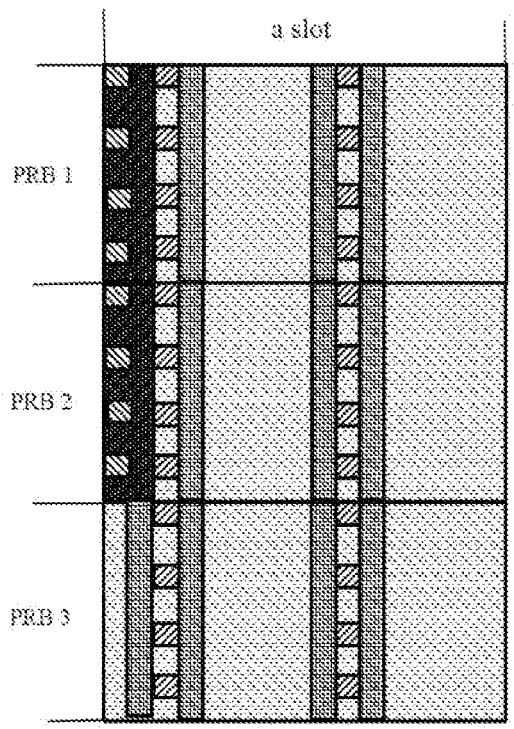

In another example, the whole PUSCH may occupy a plurality of PRBs. For example, as shown in FIG. 2B, the PUSCH may occupy three PRBs, the first physical control channel carrying the UCI type 1 may occupy a first number of PRBs, for example, two PRBs, and the second physical control channel carrying the UCI type 2 may occupy a second number of PRBs, for example, three PRBs. It should be noted that, the number of PRBs for PUSCH, the number of PRBs for the first physical control channel, the number of PRBs for the second physical control channel and/or configurations thereof shown in FIG. 2B are only for illustrative purposes, and may vary depending on specific requirements. For example, the PUSCH may occupy six PRBs, the first physical control channel carrying the UCI type 1 may occupy one PRB, and the second physical control channel carrying the UCI type 2 may occupy two PRBs.

In this case, similarly with the above example where the PUSCH occupies one PRB, some of the resource occupied by first physical control channel may be punctured for mapping the first type of DMRS, and some of the resource occupied by the PUSCH may be punctured for mapping the second type of DMRS. Thus, the first type of DMRS may be mapped to the first resource earlier than the second resource to which the second type of DMRS is mapped. Further, the first type of DMRS may be different from the second type of DMRS in terms of at least one of density, interval, number, generation sequence and antenna port for transmission.

Figure 3:
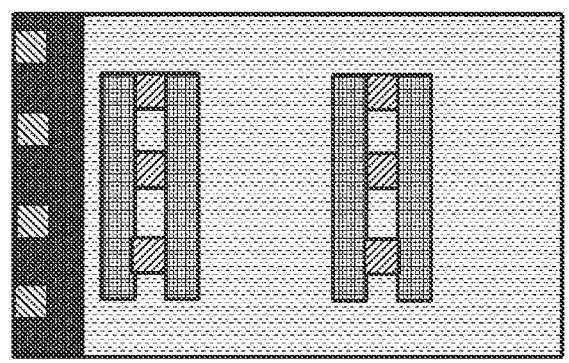
FIG. 3 schematically shows another exemplary configuration of the first and second types of DMRS in NR URLLC scenario according to an embodiment of the present disclosure.

In another example, the first physical control channel carrying the UCI type 1 may occupy the whole PRB in the frequency domain, while the second physical control channel carrying the UCI type 2 may occupy partial PRB in the frequency domain, as shown in FIG. 3. In this case, the embodiments described above for the example in FIG. 2A can be applied appropriately, including the difference between the first type of DMRS and the second type of DMRS.

In the above examples, both the UCI type 1 and the UCI type 2 are transmitted within the PUSCH. To be noted that, the above examples are only exemplary but not limited, and any other distribution scheme may be designed for the first physical control channel carrying the UCI type 1 and the second physical control channel carrying the UCI type 2 according to practical applications and scenarios, as long as the UCI type 2/PUSCH transmission avoids collision with the UCI type 1 transmission.

Figure 4:
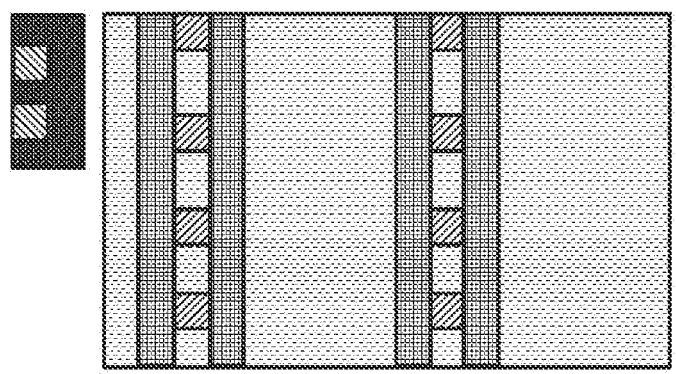
FIG. 4 schematically shows yet another exemplary configuration of the first and second types of DMRS in NR URLLC scenario according to an embodiment of the present disclosure.

Additionally, in another example, the UCI type 1 may be transmitted in the first physical control channel outside of the PUSCH, that is, TDMed with the PUSCH, as shown in FIG. 4. In this case, the first physical control channel and the PUSCH may be or may not be adjacent in the frequency domain. Similarly, the embodiments described above for the example in FIG. 2A can be applied appropriately, including the difference between the first type of DMRS and the second type of DMRS.

The design of DMRS for the UCI type 1 and the UCI type 2 in NR URLLC scenario has been described with references to FIG. 2A-FIG. 4. Advantageously, two different types of UCI can enable a UE to adapt different traffics with indication of traffic size to a gNB, and can realize different MIMO scheme, and furthermore, early decoding of PUSCH may be possible.

The present disclosure has been described above with reference to NR URLLC scenario. However, the present disclosure is not limited thereto, and may also be applied to NR V2X sidelink scenario. It should be noted that, the embodiments herein disclosed are applicable to V2X (Vehicle to Everything) that includes but not limited to V2I (vehicle to infrastructure), V2P (vehicle to pedestrian), V2V (vehicle to vehicle), and any other communication using NR sidelink.

According to an embodiment of the present disclosure, if the transmitting apparatus 100 is applied in NR V2X sidelink scenario, the first type of DMRS may be used for demodulation of PSCCH and the second type of DMRS may be used for demodulation of PSSCH.

Figure 5A:
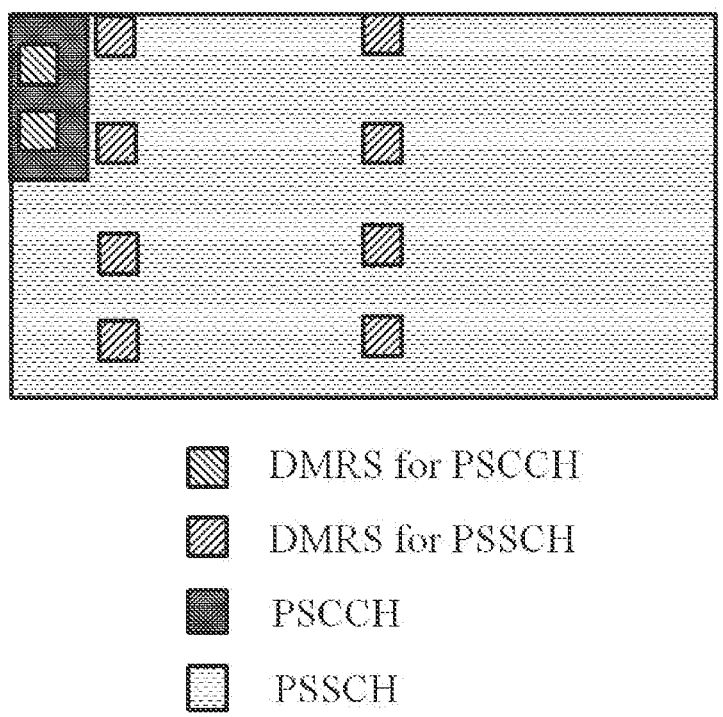
FIGS. 5A and 5B schematically show an exemplary configuration of the first and second types of DMRS in NR V2X sidelink scenario according to an embodiment of the present disclosure.

FIG. 5A schematically shows an exemplary configuration of the first and second types of DMRS in NR V2X sidelink scenario according to an embodiment of the present disclosure, where PSCCH and PSSCH are multiplied in a first multiplexing way. As shown in FIG. 5A, there may be PSCCH and PSSCH. Further, a first type of DMRS for the PSCCH and a second type of DMRS for the PSSCH may be configured. To be noted that, all channels/signals shown in FIG. 5A may be transmitted within one PRB or a plurality of PRBs.

As shown in FIG. 5A, in the first multiplexing way of PSCCH and PSSCH, the starting position of the PSCCH in the time domain is the same as that of the PSSCH while the ending position of the PSCCH in the time domain is earlier than that of the PSSCH, and the frequency band occupied by the PSCCH totally falls in the frequency band occupied by the PSSCH. It should be noted that, for this first multiplexing way, the position of the PSCCH in the frequency domain may be aligned with that of the PSSCH (shown in FIG. 5A), or may not be aligned with that of the PSSCH (not shown in FIG. 5A).

As shown in FIG. 5A, some of resources may be reserved for the first type of DMRS and the second type of DMRS respectively. For example, some of the resource occupied by the PSCCH may be punctured for mapping the first type of DMRS, and some of the resource occupied by the PSSCH may be punctured for mapping the second type of DMRS. Thus, the second type of DMRS may be mapped to the second resource later than the first resource to which the first type of DMRS is mapped and later than the PSCCH. It should be noted that other schemes are also available for reserving resources for the first and second types of DMRS, such as rate matching and the like.

In this embodiment, the first type of DMRS may be different from the second type of DMRS in terms of at least one of density, interval, number, generation sequence and antenna port for transmission, which has been described in detail with reference to FIG. 2A, and are omitted here for the purpose of clarity and brevity.

Figure 5B:
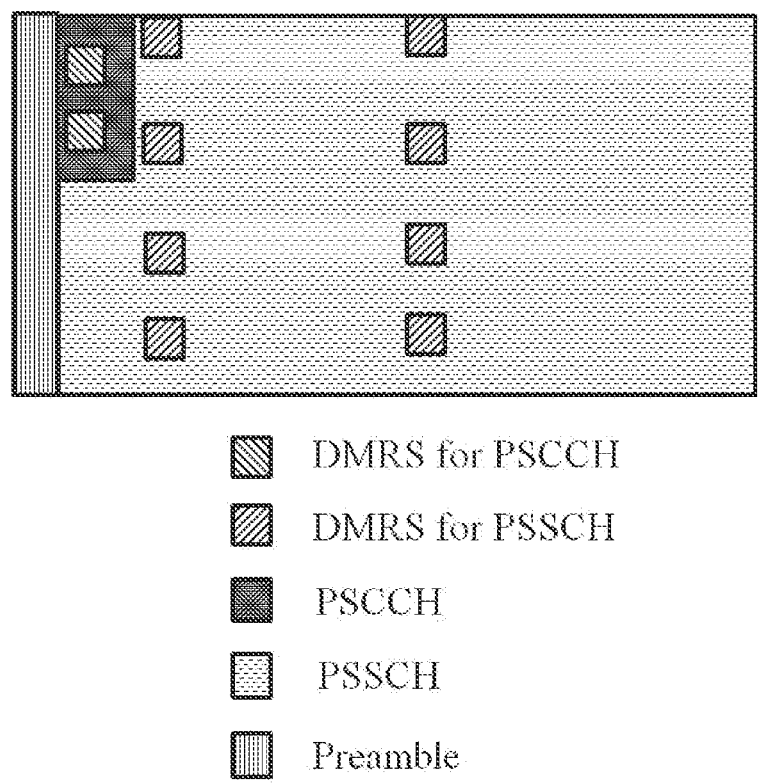

In an embodiment, a preamble may be transmitted before PSCCH. As shown in FIG. 5B, the preamble used for Automatic Gain Control (AGC) may be additionally transmitted before the PSCCH with respect to the example of FIG. 5A.

Further, the preamble is now described with reference to FIGS. 9A and 9B. The preamble may be transmitted before PSSCH/PSCCH with fixed numerology, and the numerology of the preamble may be different from that of PSSCH/PSCCH, for example, smaller than that of PSSCH/PSCCH. In an example, as shown in FIGS. 9A and 9B, the numerology of the preamble used for AGC is, for example, 60 KHz, while the numerology of PSSCH/PSCCH is 30 KHz, for example. In an embodiment, duration of the preamble may be symbol aligned with that of PSCCH/PSSCH by repetitions. As shown in FIG. 9A, the preamble is repeated twice such that the duration of the preamble is symbol aligned with the duration of one OFDM symbol for PSCCH/PSSCH. In another embodiment, the duration of the preamble may not be symbol aligned with that of PSCCH/PSSCH, as shown in FIG. 9B.

Referring back to FIG. 5B, in an embodiment, from receiver point of view, the preamble may be used for demodulation of PSCCH if antenna port or numerology of the preamble is the same as that of the first type of DMRS, and the preamble may be used for demodulation of PSSCH if antenna port or numerology of the preamble is the same as that of the second type of DMRS. In one example, the preamble together with the first type of DMRS is jointed used to demodulate the PSSCH if antenna port or numerology of the preamble is the same as that of the first type of DMRS. In another example, the preamble together with the second type of DMRS is jointly used to demodulate the PSCCH if antenna port or numerology of the preamble is the same as that of the second type of DMRS. In another example, the preamble is used not only to demodulate the PSCCH together with the first type of DMRS, but also to demodulate the PSSCH together with the second type of DMRS, if antenna port or numerology of the preamble is the same as that of both the first type of DMRS and the second type of DMRS.

Figure 6:
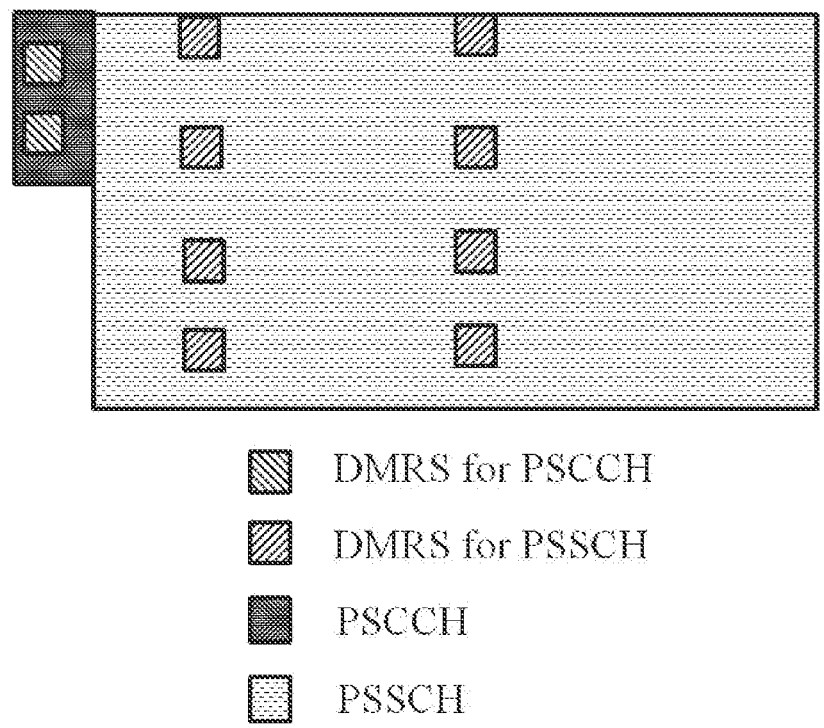
FIG. 6 schematically shows another exemplary configuration of the first and second types of DMRS in NR V2X sidelink scenario according to an embodiment of the present disclosure.

FIG. 6 schematically shows another exemplary configuration of the first and second types of DMRS in NR V2X sidelink scenario according to an embodiment of the present disclosure, where PSCCH and PSSCH are multiplexed in a second multiplexing way.

As shown in FIG. 6, in the second multiplexing way of PSCCH and PSSCH, the PSCCH and the PSSCH are TDMed while the PSCCH and the PSSCH occupies different frequency bands, for example, the size of the PSCCH in the frequency domain is smaller than that of the PSSCH. It should be noted that, for this second multiplexing way, the position of the PSCCH in the frequency domain may be aligned with that of the PSSCH (shown in FIG. 6), or may not be aligned with that of the PSSCH (not shown in FIG. 6), which means the position of the PSCCH in the frequency domain may be offset upward or downward with respect to the position of the PSSCH shown in FIG. 6.

As shown in FIG. 6, some of resources may be reserved for the first type of DMRS and the second type of DMRS respectively. For example, some of the resource occupied by the PSCCH may be punctured for mapping the first type of DMRS, and some of the resource occupied by the PSSCH may be punctured for mapping the second type of DMRS. Thus, the second type of DMRS may be mapped to the second resource later than the first resource to which the first type of DMRS is mapped and later than the PSCCH. It should be noted that other schemes are also available for reserving resources for the first and second types of DMRS, such as rate matching and the like.

Figure 7:
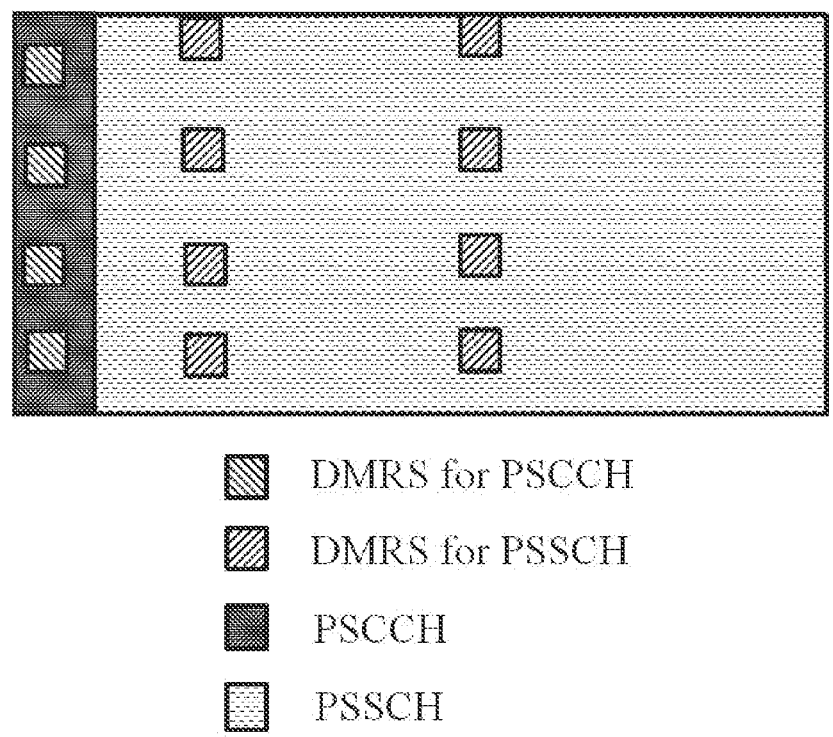
FIG. 7 schematically shows yet another exemplary configuration of the first and second types of DMRS in NR V2X sidelink scenario according to an embodiment of the present disclosure.

FIG. 7 schematically shows yet another exemplary configuration of the first and second types of DMRS in NR V2X sidelink scenario according to an embodiment of the present disclosure, where PSCCH and PSSCH are multiplexed in a third multiplexing way. In particular, the PSCCH and the PSSCH are TDMed and occupy the same frequency band.

As shown in FIG. 7, some of resources may be reserved for the first type of DMRS and the second type of DMRS respectively. For example, some of the resource occupied by the PSCCH may be punctured for mapping the first type of DMRS, and some of the resource occupied by the PSSCH may be punctured for mapping the second type of DMRS. Thus, the second type of DMRS may be mapped to the second resource later than the first resource to which the first type of DMRS is mapped and later than the PSCCH. It should be noted that other schemes are also available for reserving resources for the first and second types of DMRS, such as rate matching and the like.

Figure 8:
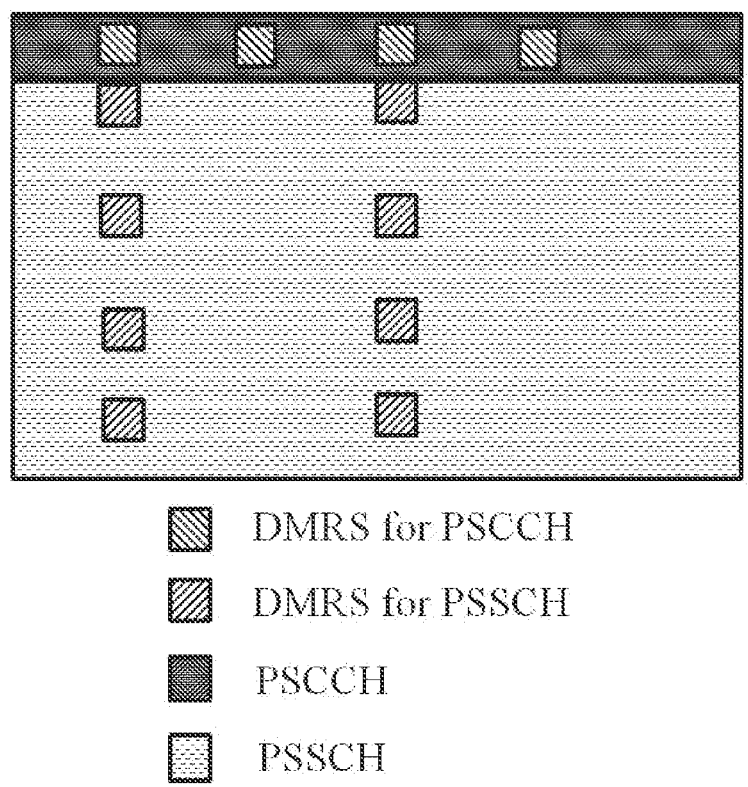
FIG. 8 schematically shows still another exemplary configuration of the first and second types of DMRS in NR V2X sidelink scenario according to an embodiment of the present disclosure.

FIG. 8 schematically shows still another exemplary configuration of the first and second types of DMRS in NR V2X sidelink scenario according to an embodiment of the present disclosure, where PSCCH and PSSCH are multiplexed in a fourth multiplexing way. That is, the PSCCH and the PSSCH are FDMed. In this case, for example, the first type of DMRS used for the PSCCH has a larger density in time domain than the second type of DMRS used for the PSSCH. Additionally, compared to the above examples shown in FIGS. 5A, 6 and 7, one exception for this example shown in FIG. 8 is that the first type of DMRS used for the PSCCH may be transmitted earlier than the second type of DMRS used for the PSSCH (not shown in FIG. 8) or may not be transmitted earlier than the second type of DMRS used for the PSSCH (shown in FIG. 8).

It is to be noted that, in FIGS. 6-8, the first type of DMRS may be different from the second type of DMRS in terms of at least one of density, interval, number, generation sequence and antenna port for transmission, which has been described in detail with reference to FIGS. 1 and 2, and are omitted here for the purpose of clarity and brevity. Additionally, the configuration of the preamble described above with reference to FIGS. 5B, 9A and 9B can be applied to these examples shown in FIGS. 6-8, that is, the preamble may be transmitted before the PSCCH/PSSCH shown in FIGS. 6-8.

The design of DMRS for PSCCH and PSSCH in NR V2X sidelink scenario has been described with references to FIG. 5A-9B. Advantageously, the design of DMRS can support for four different multiplexing ways of PSCCH and PSSCH.

Advantageously, a common design of the DMRS used in both NR URLLC scenario and NR V2X sidelink scenario can be achieved to save the standardization efforts.

Figure 10:
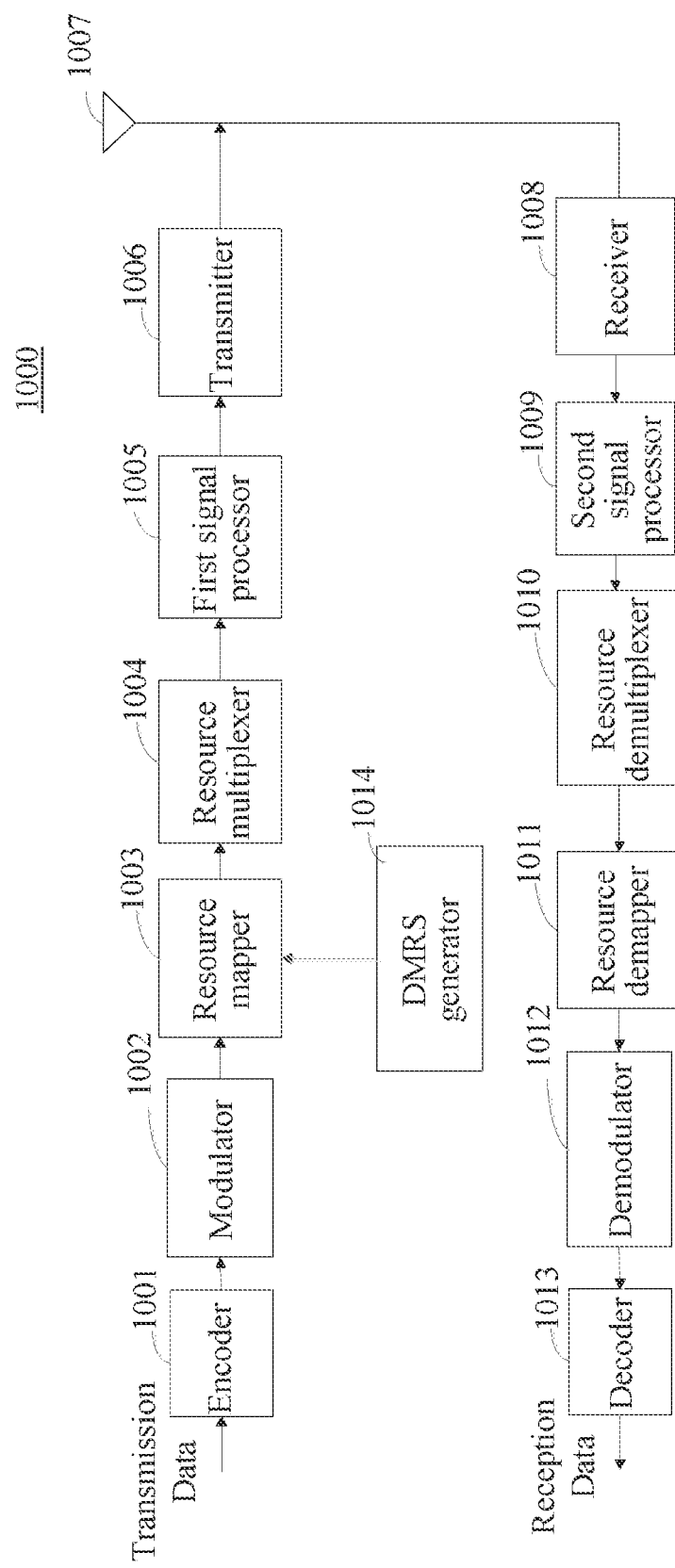
FIG. 10 schematically shows a detailed block diagram of a transmitting apparatus according to an embodiment of the present disclosure.

In another embodiment of the present disclosure, there is provided a transmitting apparatus as shown in FIG. 10. FIG. 10 schematically shows a detailed block diagram of a transmitting apparatus according to an embodiment of the present disclosure. As shown in FIG. 10, the transmitting apparatus 1000 includes an encoder 1001, a modulator 1002, a resource mapper 1003, a resource multiplexer 1004, a first signal processor 1005, a transmitter 1006, an antenna 1007, a receiver 1008, a second signal processor 1009, a resource demultiplexer 1010, a resource demapper 1011, a demodulator 1012, a decoder 1013 and a DMRS generator 1014.

For example, the encoder 1001 performs encoding processing on transmission data, and the modulator 1002 performs modulation processing on the encoded transmission data to generate data symbol and control symbol. The DMRS generator 1014 generates a first type of DMRS and a second type of DMRS. The resource mapper 1003 maps the data symbol, the control symbol and DMRS symbol onto physical resources. For example, in an embodiment, when the transmission data belongs to uplink data in NR URLLC scenario, the first type of DMRS is used for a first physical control channel and the second type of DMRS is used for a second physical control channel. In another embodiment, when the transmission data belongs to sidelink data in NR V2X scenario, the first type of DMRS is used for PSCCH and the second type of DMRS is used for PSSCH. The resource multiplexer 1004 multiplexes the data symbol, the control symbol, the DMRS symbol and/or other information such as synchronization information, etc. The first signal processor 1005 performs the signal processing such as up-conversion on the multiplexed signal output from the resource multiplexer 1004. The transmitter 1006 transmits the processed signal to another apparatus via the antenna 1007.

According to an embodiment of the present disclosure, the resource mapper 1003 maps the first type of DMRS to a first resource, and maps the second type of DMRS to a second resource. For example, the first resource is earlier than the second resource in the time domain.

According to an embodiment of the present disclosure, the DMRS generator 1014 may configure the first type of DMRS and the second type of DMRS differently in terms of at least one of: density, interval, number, generation sequence and antenna port for transmission.

In addition, the receiver 1008 may receive a signal from another apparatus via the antenna 1007. The second signal processor 1009 performs the signal processing such as down conversion on the signal received by the receiver 1008. The resource demultiplexer 1010 demultiplexes the processed signal into control symbol and/or data symbol. The resource demapper 1011 demaps the control symbol and/or the data symbol from the physical resources. The demodulatoer 1012 performs demodulation processing on the control symbol and/or the data symbol based on DMRS, and the decoder 1013 performs decoding processing on the demodulated control symbol and/or data symbol to obtain the reception data.

Note that, the transmitting apparatus 1000 shown in FIG. 10 may function as the transmitting apparatus 100 as shown in FIG. 1. Specifically, the transmitter 1006 may correspond to the transmitter 120. The circuitry 110 may include the encoder 1001, the modulator 1002, the resource mapper 1003, the resource multiplexer 1004, the first signal processor 1005, the second signal processor 1009, the resource demultiplexer 1010, the resource demapper 1011, the demodulator 1012, the decoder 1013 and the DMRS generator 1014. Alternatively, one or more of these units may also be separated from the circuitry 110 depending on specific requirements.

Figure 11:
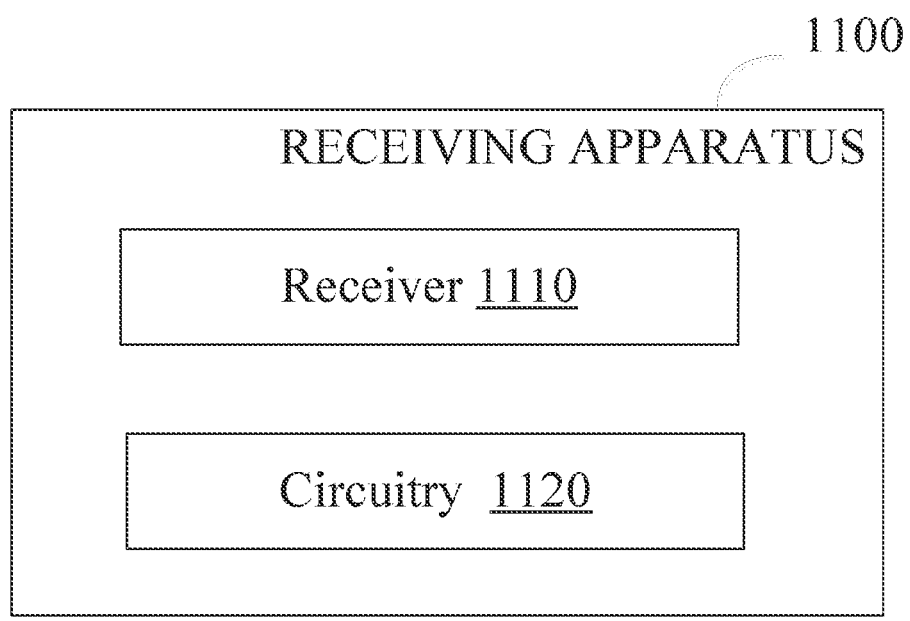
FIG. 11 illustrates a block diagram of a receiving apparatus according to an embodiment of the present disclosure.

In another embodiment of the present disclosure, there is provided a receiving apparatus as shown in FIG. 11. FIG. 11 illustrates a block diagram of a receiving apparatus according to an embodiment of the present disclosure. FIG. 11 illustrates a block diagram of a receiving apparatus 1100 according to an embodiment of the present disclosure. The receiving apparatus 1100 includes a receiver 1110 and a circuitry 1120.

It should be noted that the receiver 1110 and the circuitry 1120 disclosed in FIG. 11 are exemplary but not limited. That is, the receiving apparatus 1100 may include various other structural or functional elements, or variations of the elements recited in FIG. 11. For example, the receiving apparatus 1100 may further include a transmitter. Alternatively, the receiving apparatus 1100 may include a transceiver instead of the receiving apparatus 1100.

It should be noted that the transmitting apparatus of FIG. 1 and the receiving apparatus of FIG. 11 may be collectively called as a communication apparatus or combined into one communication apparatus, and such communication apparatus may comprise the circuitry 110, the circuitry 1120, the transmitter 120 and the receiver 1110. Further, such communication apparatus may include other structural or functional elements.

As shown in FIG. 11, the receiver 1110 may be operative to receive a signal including a first type of reference signal used for demodulation and a second type of reference signal used for demodulation. The circuitry 1120 may be operative to perform demodulation based on the first type of reference signal used for demodulation and the second type of reference signal used for demodulation. For example, the first type of reference signal used for demodulation may be used for a first physical control channel and the second type of reference signal used for demodulation may be used for a second physical control channel. Alternatively, the first type of reference signal used for demodulation may be used for PSCCH and the second type of reference signal used for demodulation may be used for PSSCH.

For example, in the following detailed description, the reference signal used for demodulation is described taking DMRS as an example. It is to be noted that, although the embodiments herein assume DMRS as the reference signal used for demodulation, the present disclosure is not limited thereto. The embodiments of the present disclosure are also applicable to any other kinds of reference signal used for demodulation.

According to an embodiment of the present disclosure, the first type of DMRS may be mapped to the first resource earlier than the second resource to which the second type of DMRS is mapped.

According to an embodiment of the present disclosure, the first type of DMRS may differ from the second type of DMRS in at least one of: density, interval, number, generation sequence and antenna port for transmission.

According to an embodiment of the present disclosure, a first type of UCI indicating PUSCH resource allocation may be carried on the first physical control channel, and a second type of UCI carrying CSI or HARQ-ACK may be carried on the second physical control channel.

According to an embodiment of the present disclosure, data in PUSCH may be transmitted based on a first type of grant-free transmission or a second type of grant-free transmission.

According to an embodiment of the present disclosure, the second type of DMRS may be further used for demodulation of data in PUSCH.

According to an embodiment of the present disclosure, position in time domain and frequency domain for the first type of UCI may be fixed.

According to an embodiment of the present disclosure, a preamble may be transmitted before PSCCH. The preamble may be used for demodulation of PSCCH if antenna port or numerology of the preamble is the same as that of the first type of DMRS, and the preamble may be used for demodulation of PSSCH if antenna port or numerology of the preamble is the same as that of the second type of DMRS.

According to an embodiment of the present disclosure, a preamble may be transmitted before PSCCH with fixed numerology.

According to an embodiment of the present disclosure, a preamble may be transmitted before PSCCH, and duration of the preamble may be symbol aligned with that of PSCCH/PSSCH by repetitions.

According to an embodiment of the present disclosure, a preamble may be transmitted before PSCCH, and numerology of the preamble may be different from that of PSSCH/PSCCH.

With the receiving apparatus 1100, by using a common design of the reference signal used for demodulation for both NR URLLC scenario and NR V2X sidelink scenario, the standardization efforts can be saved.

Figure 12:
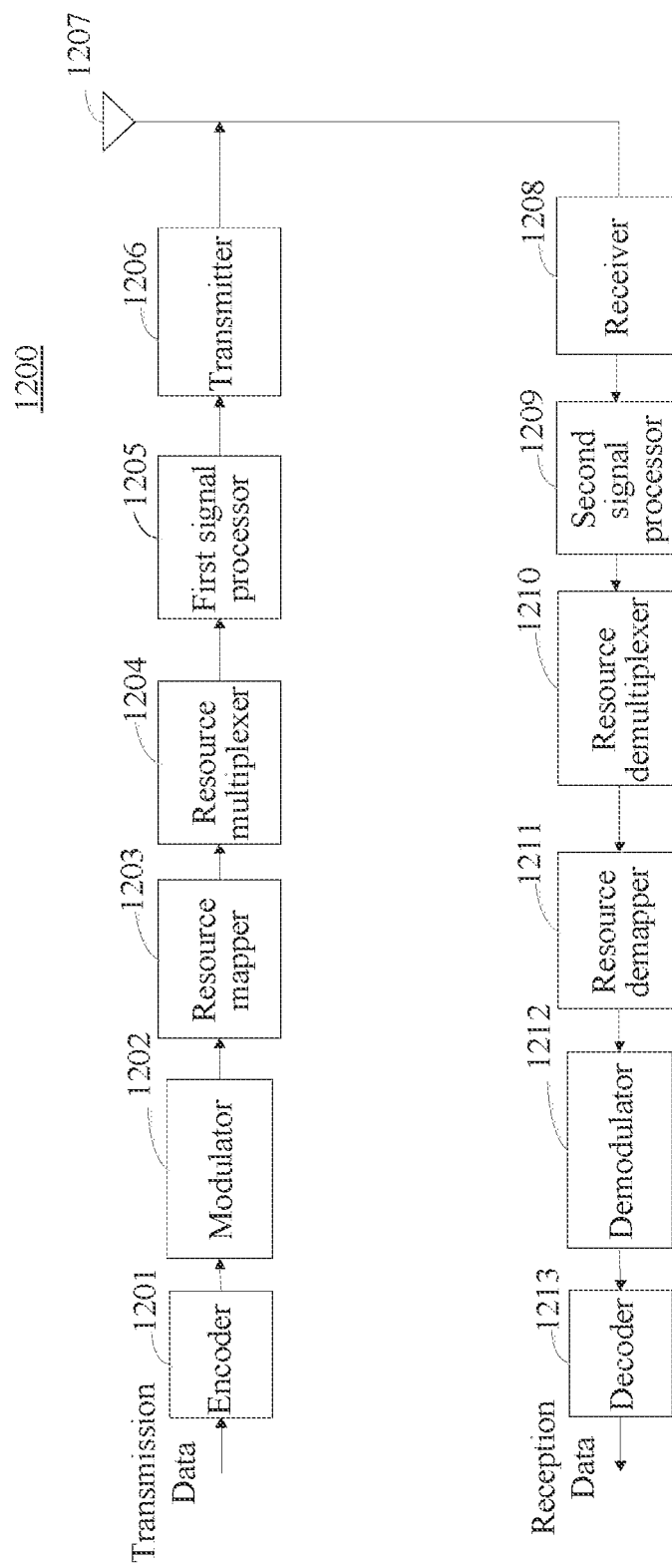
FIG. 12 schematically shows a detailed block diagram of a receiving apparatus according to an embodiment of the present disclosure.

In another embodiment of the present disclosure, there is provided a receiving apparatus as shown in FIG. 12. FIG. 12 schematically shows a detailed block diagram of a receiving apparatus according to an embodiment of the present disclosure. As shown in FIG. 12, the receiving apparatus 1200 includes an encoder 1201, a modulator 1202, a resource mapper 1203, a resource multiplexer 1204, a first signal processor 1205, a transmitter 1206, an antenna 1207, a receiver 1208, a second signal processor 1209, a resource demultiplexer 1210, a resource demapper 1211, a demodulator 1212, and a decoder 1213.

For example, the receiver 1208 may receive a signal from another apparatus via the antenna 1207. The second signal processor 1209 performs the signal processing such as down conversion on the signal received by the receiver 1208. The resource demultiplexer 1210 demultiplexes the processed signal into DMRS symbol, control symbol and/or data symbol. The resource demapper 1211 demaps the DMRS symbol, the control symbol and/or the data symbol from the physical resources. The demodulatoer 1212 performs demodulation processing on the control symbol and/or the data symbol based on DMRS symbol. For example, there are two types of DMRS, wherein a first type of DMRS is mapped to a first resource, and a second type of DMRS is mapped to a second resource. In an embodiment, when the transmission data belongs to uplink data in NR URLLC scenario, the first type of DMRS is used for demodulation of a first physical control channel and the second type of DMRS is used for demodulation of a second physical control channel. In another embodiment, when the transmission data belongs to sidelink data in NR V2X scenario, the first type of DMRS is used for demodulation of PSCCH and the second type of DMRS is used for demodulation of PSSCH. The decoder 1213 performs decoding processing on the demodulated control symbol and/or data symbol to obtain the reception data.

According to an embodiment of the present disclosure, the first type of DMRS may be mapped to the first resource earlier than the second resource to which the second type of DMRS is mapped.

According to an embodiment of the present disclosure, the first type of DMRS may differ from the second type of DMRS in terms of at least one of: density, interval, number, generation sequence and antenna port for transmission.

In addition, the encoder 1201 performs encoding processing on transmission data, and the modulator 1202 performs modulation processing on the encoded transmission data to generate data symbol and control symbol. The resource mapper 1203 maps the data symbol, the control symbol onto physical resources. The resource multiplexer 1204 multiplexes the data symbol, the control symbol, and/or other information such as synchronization information, etc. The first signal processor 1205 performs the signal processing such as up-conversion on the multiplexed signal output from the resource multiplexer 1204. The transmitter 1206 transmits the processed signal to another apparatus via the antenna 1207.

Note that, the receiving apparatus 1200 shown in FIG. 12 may function as the receiving apparatus 1100 as shown in FIG. 11. Specifically, the receiver 1208 may correspond to the receiver 1110. The circuitry 1120 may include the encoder 1201, the modulator 1202, the resource mapper 1203, the resource multiplexer 1204, the first signal processor 1205, the second signal processor 1209, the resource demultiplexer 1210, the resource demapper 1211, the demodulator 1212, and the decoder 1213. Alternatively, one or more of these units may also be separated from the circuitry 1120 depending on specific requirements.

Figure 13:
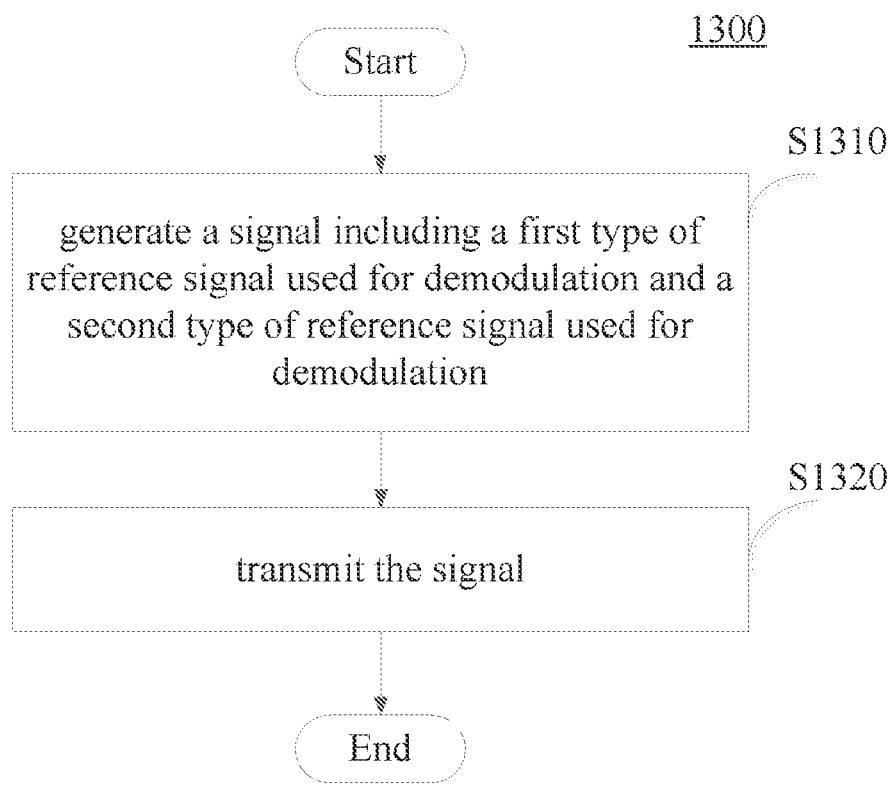
FIG. 13 schematically shows a flowchart of a transmitting method according to an embodiment of the present disclosure.

In a further embodiment of the present disclosure, there is provided a transmitting method for a transmitting apparatus as shown in FIG. 13. FIG. 13 schematically shows a flowchart 1300 of a transmitting method according to an embodiment of the present disclosure. For example, the transmitting method may be performed by the transmitting apparatus 100 as shown in FIG. 1 or the transmitting apparatus 1000 as shown in FIG. 10.

Although specific steps are disclosed in FIG. 13, such steps are exemplary. That is, the present disclosure is well suited to performing various other steps or variations of the steps recited in FIG. 13.

At a step S1310, the transmitting apparatus 100/1000 generates a signal including a first type of reference signal used for demodulation and a second type of reference signal used for demodulation. At a step S1320, the transmitting apparatus 100/1000 transmits the above signal. For example, the first type of reference signal used for demodulation may be used for a first physical control channel and the second type of reference signal used for demodulation may be used for a second physical control channel; or the first type of reference signal used for demodulation may be used for PSCCH and the second type of reference signal used for demodulation may be used for PSSCH.

With the transmitting method 1300, by using a common design of the reference signal used for demodulation for both NR URLLC scenario and NR V2X sidelink scenario, the standardization efforts can be saved.

Figure 14:
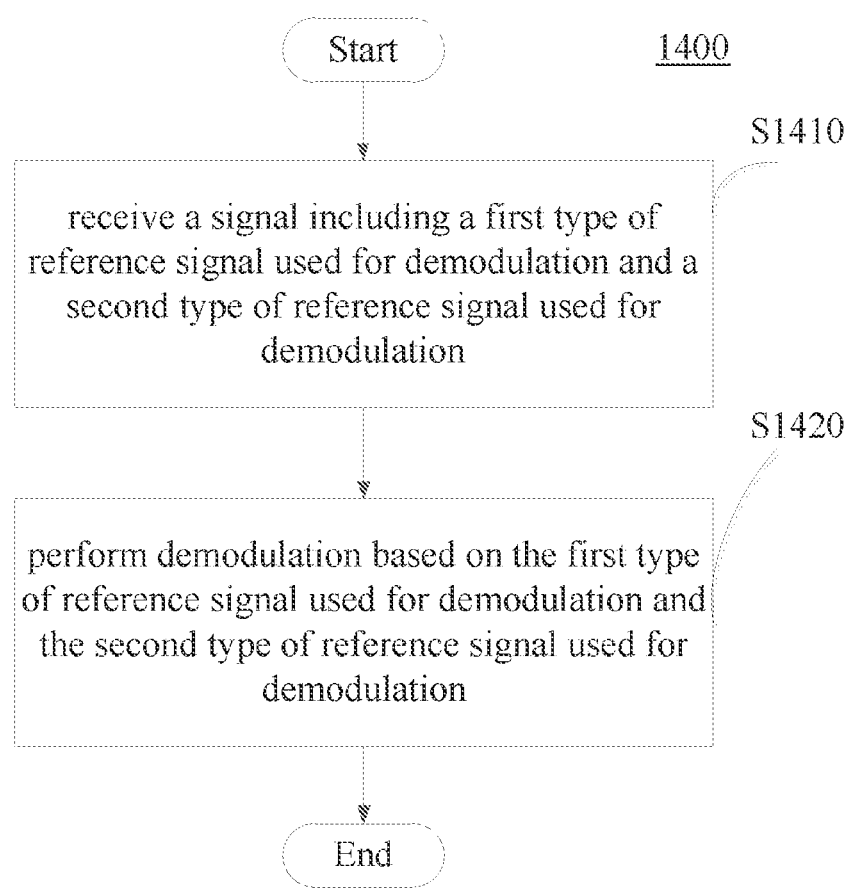
FIG. 14 schematically shows a flowchart of a receiving method according to an embodiment of the present disclosure.

In a further embodiment of the present disclosure, there is provided a receiving method for a receiving apparatus as shown in FIG. 14. FIG. 14 schematically shows a flowchart of a receiving method 1400 according to an embodiment of the present disclosure. In an embodiment, the receiving method 1400 may be performed by the receiving apparatus 1100/1200.

Although specific step is disclosed in FIG. 14, such step is exemplary. That is, the present disclosure is well suited to performing various other steps or variations of the steps recited in FIG. 14.

At a step S1420, the receiving apparatus 1100/1200 receives a signal including a first type of reference signal used for demodulation and a second type of reference signal used for demodulation. At a step S1440, the receiving apparatus 1100/1200 performs demodulation based on the first type of reference signal used for demodulation and the second type of reference signal used for demodulation. For example, the first type of reference signal used for demodulation may be used for a first physical control channel and the second type of reference signal used for demodulation may be used for a second physical control channel; or the first type of reference signal used for demodulation may be used for PSCCH and the second type of reference signal used for demodulation may be used for PSSCH.

With the transmitting method 1400, by using a common design of the reference signal used for demodulation for both NR URLLC scenario and NR V2X sidelink scenario, the standardization efforts can be saved.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication apparatus.

Some non-limiting examples of such communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)". The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

It is to be noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

Embodiments of the present disclosure can at least provide the following subject matters.

(1). A transmitting apparatus, comprising:
circuitry, which, in operation, generates a signal including a first type of reference signal used for demodulation and a second type of reference signal used for demodulation; and
a transmitter, which, in operation, transmits the signal,
wherein the first type of reference signal used for demodulation is mapped to a first resource, and the second type of reference signal used for demodulation is mapped to a second resource,
the first type of reference signal used for demodulation is used for a first physical control channel and the second type of reference signal used for demodulation is used for a second physical control channel; or the first type of reference signal used for demodulation is used for PSCCH and the second type of reference signal used for demodulation is used for PSSCH.

(2). The transmitting apparatus according to (1), wherein the first type of reference signal used for demodulation is mapped to the first resource earlier than the second resource to which the second type of reference signal used for demodulation is mapped.

(3). The transmitting apparatus according to (1), wherein the first type of reference signal used for demodulation differs from the second type of reference signal used for demodulation in at least one of: density, interval, number, generation sequence and antenna port for transmission.

(4). The transmitting apparatus according to (1), wherein a first type of UCI indicating PUSCH resource allocation is carried on the first physical control channel, and a second type of UCI carrying CSI or HARQ-ACK is carried on the second physical control channel.

(5). The transmitting apparatus according to (4), wherein data in PUSCH is transmitted based on a first type of grant-free transmission or a second type of grant-free transmission.

(6). The transmitting apparatus according to (4), wherein the second type of reference signal used for demodulation is further used for demodulation of data in PUSCH.

(7). The transmitting apparatus according to (4), wherein position in time domain and frequency domain for the first type of UCI is fixed.

(8). The transmitting apparatus according to (1), wherein a preamble is transmitted before PSCCH, the preamble is used for demodulation of PSCCH if antenna port or numerology of the preamble is the same as that of the first type of reference signal used for demodulation, and the preamble is used for demodulation of PSSCH if antenna port or numerology of the preamble is the same as that of the second type of reference signal used for demodulation.

(9). The transmitting apparatus according to (1), wherein a preamble is transmitted before PSCCH with fixed numerology.

(10). The transmitting apparatus according (1), wherein a preamble is transmitted before PSCCH, and duration of the preamble is symbol aligned with that of PSCCH/PSSCH by repetitions.

(11). The transmitting apparatus according to (1), wherein a preamble is transmitted before PSCCH, and numerology of the preamble is different from that of PSSCH/PSCCH.

(12). A receiving apparatus, comprising:
a receiver, which, in operation, receives a signal including a first type of reference signal used for demodulation and a second type of reference signal used for demodulation; and circuitry, which, in operation, performs demodulation based on the first type of reference signal used for demodulation and the second type of reference signal used for demodulation,
wherein the first type of reference signal used for demodulation is mapped to a first resource, and the second type of reference signal used for demodulation is mapped to a second resource,
the first type of reference signal used for demodulation is used for a first physical control channel and the second type of reference signal used for demodulation is used for a second physical control channel; or the first type of reference signal used for demodulation is used for PSCCH and the second type of reference signal used for demodulation is used for PSSCH.

(13). The receiving apparatus according to (12), wherein the first type of reference signal used for demodulation is mapped to the first resource earlier than the second resource to which the second type of reference signal used for demodulation is mapped.

(14). The receiving apparatus according to (12), wherein the first type of reference signal used for demodulation differs from the second type of reference signal used for demodulation in at least one of: density, interval, number, generation sequence and antenna port for transmission.

(15). The receiving apparatus according to (12), wherein a first type of UCI indicating PUSCH resource allocation is carried on the first physical control channel, and a second type of UCI carrying CSI or HARQ-ACK is carried on the second physical control channel.

(16). The receiving apparatus according to (15), wherein data in PUSCH is transmitted based on a first type of grant-free transmission or a second type of grant-free transmission.

(17). The receiving apparatus according to (15), wherein the second type of reference signal used for demodulation is further used for demodulation of data in PUSCH.

(18). The receiving apparatus according to (15), wherein position in time domain and frequency domain for the first type of UCI is fixed.

(19). The receiving apparatus according to (12), wherein a preamble is received before PSCCH, the preamble is used for demodulation of PSCCH if antenna port or numerology of the preamble is the same as that of the first type of reference signal used for demodulation, and the preamble is used for demodulation of PSSCH if antenna port or numerology of the preamble is the same as that of the second type of reference signal used for demodulation.

(20). The receiving apparatus according to (12), wherein a preamble is transmitted before PSCCH with fixed numerology.

(21). The receiving apparatus according to (12), wherein a preamble is transmitted before PSCCH, and duration of the preamble is symbol aligned with that of PSCCH/PSSCH by repetitions.

(22). The receiving apparatus according to (12), wherein a preamble is transmitted before PSCCH, and numerology of the preamble is different from that of PSSCH/PSCCH.

(23). A transmitting method, comprising:
generating a signal including a first type of reference signal used for demodulation and a second type of reference signal used for demodulation; and
transmitting the signal,
wherein the first type of reference signal used for demodulation is mapped to a first resource, and the second type of reference signal used for demodulation is mapped to a second resource,
the first type of reference signal used for demodulation is used for a first physical control channel and the second type of reference signal used for demodulation is used for a second physical control channel; or the first type of reference signal used for demodulation is used for PSCCH and the second type of reference signal used for demodulation is used for PSSCH.

(24). The transmitting method according to (23), wherein the first type of reference signal used for demodulation is mapped to the first resource earlier than the second resource to which the second type of reference signal used for demodulation is mapped.

(25). The transmitting method according to (23), wherein the first type of reference signal used for demodulation differs from the second type of reference signal used for demodulation in at least one of: density, interval, number, generation sequence and antenna port for transmission.

(26). The transmitting method according to (23), wherein a first type of UCI indicating PUSCH resource allocation is carried on the first physical control channel, and a second type of UCI carrying CSI or HARQ-ACK is carried on the second physical control channel.

(27). The transmitting method according to (26), wherein data in PUSCH is transmitted based on a first type of grant-free transmission or a second type of grant-free transmission.

(28). The transmitting method according to (26), wherein the second type of reference signal used for demodulation is further used for demodulation of data in PUSCH.

(29). The transmitting method according to (26), wherein position in time domain and frequency domain for the first type of UCI is fixed.

(30). The transmitting method according to (23), wherein a preamble is transmitted before PSCCH, the preamble is used for demodulation of PSCCH if antenna port or numerology of the preamble is the same as that of the first type of reference signal used for demodulation, and the preamble is used for demodulation of PSSCH if antenna port or numerology of the preamble is the same as that of the second type of reference signal used for demodulation.

(31). The transmitting method according to (23), wherein a preamble is transmitted before PSCCH with fixed numerology.

(32). The transmitting method according to (23), wherein a preamble is transmitted before PSCCH, and duration of the preamble is symbol aligned with that of PSCCH/PSSCH by repetitions.

(33). The transmitting method according to (23), wherein a preamble is transmitted before PSCCH, and numerology of the preamble is different from that of PSSCH/PSCCH.

(34). A receiving method, comprising:
receiving a signal including a first type of reference signal used for demodulation and a second type of reference signal used for demodulation; and
performing demodulation based on the first type of reference signal used for demodulation and the second type of reference signal used for demodulation,
wherein the first type of reference signal used for demodulation is mapped to a first resource, and the second type of reference signal used for demodulation is mapped to a second resource,
the first type of reference signal used for demodulation is used for a first physical control channel and the second type of reference signal used for demodulation is used for a second physical control channel; or the first type of reference signal used for demodulation is used for PSCCH and the second type of reference signal used for demodulation is used for PSSCH.

(35). The receiving method according to claim 12, wherein the first type of reference signal used for demodulation is mapped to the first resource earlier than the second resource to which the second type of reference signal used for demodulation is mapped.

(36). The receiving method according to (34), wherein the first type of reference signal used for demodulation differs from the second type of reference signal used for demodulation in at least one of: density, interval, number, generation sequence and antenna port for transmission.

(37). The receiving method according to (34), wherein a first type of UCI indicating PUSCH resource allocation is carried on the first physical control channel, and a second type of UCI carrying CSI or HARQ-ACK is carried on the second physical control channel.

(38). The receiving method according to (37), wherein data in PUSCH is transmitted based on a first type of grant-free transmission or a second type of grant-free transmission.

(39). The receiving method according to (37), wherein the second type of reference signal used for demodulation is further used for demodulation of data in PUSCH.

(40). The receiving method according to (37), wherein position in time domain and frequency domain for the first type of UCI is fixed.

(41). The receiving method according to (34), wherein a preamble is received before PSCCH, the preamble is used for demodulation of PSCCH if antenna port or numerology of the preamble is the same as that of the first type of reference signal used for demodulation, and the preamble is used for demodulation of PSSCH if antenna port or numerology of the preamble is the same as that of the second type of reference signal used for demodulation.

(42). The receiving method according to (34), wherein a preamble is transmitted before PSCCH with fixed numerology.

(43). The receiving method according to (34), wherein a preamble is transmitted before PSCCH, and duration of the preamble is symbol aligned with that of PSCCH/PSSCH by repetitions.

(44). The receiving method according to (34), wherein a preamble is transmitted before PSCCH, and numerology of the preamble is different from that of PSSCH/PSCCH.

The invention claimed is:

1. An integrated circuit, comprising:
generation circuitry, which, in operation, controls generating first reference signals used for a physical sidelink control channel (PSCCH) and second reference signals used for a physical sidelink shared channel (PSSCH); and
transmission circuitry, which, in operation, controls transmitting the first and second reference signals within a slot,
wherein the first reference signals are mapped to a first resource, and the second reference signals are mapped to a second resource which is different from the first resource,
wherein a first time interval between the first reference signals is shorter than a second time interval between the second reference signals.

2. The integrated circuit according to claim 1, wherein a sequence of the first reference signals is different from that of the second reference signals.

3. The integrated circuit according to claim 1, wherein a mapping of the PSCCH and a mapping of the PSSCH start from a same symbol, and the mapping of the PSCCH and the mapping of the PSSCH end at different symbols.

4. The integrated circuit according to claim 1, wherein a symbol length used for the PSSCH is longer than that for the PSCCH.

5. The integrated circuit according to claim 1, wherein one or more repetition signals are transmitted in a symbol preceding the PSCCH and the PSSCH.

6. The integrated circuit according to claim 1, wherein a preamble is transmitted in one symbol preceding the PSCCH and the PSSCH.

7. The integrated circuit according to claim 1, wherein a number of antenna ports is different between the PSSCH and the PSCCH.

8. The integrated circuit according to claim 1, wherein the PSSCH and the PSCCH are multiplexed in a frequency domain.

9. A communication apparatus, comprising:
circuitry, which, in operation, generates first reference signals used for a physical sidelink control channel (PSCCH) and second reference signals used for a physical sidelink shared channel (PSSCH); and
a transmitter, which, in operation, transmits the first and second reference signals within a slot,
wherein the first reference signals are mapped to a first resource, and the second reference signals are mapped to a second resource which is different from the first resource,
wherein a first time interval between the first reference signals is shorter than a second time interval between the second reference signals,
wherein the PSSCH and the PSCCH are multiplexed in a frequency domain.

10. A communication method, comprising:
generating first reference signals used for a physical sidelink control channel (PSCCH) and second reference signals used for a physical sidelink shared channel (PSSCH); and
transmitting the first and second reference signals within a slot,
wherein the first reference signals are mapped to a first resource, and the second reference signals are mapped to a second resource which is different from the first resource,
wherein a first time interval between the first reference signals is shorter than a second time interval between the second reference signals,
wherein the PSSCH and the PSCCH are multiplexed in a frequency domain.

11. A communication apparatus, comprising:
circuitry, which, in operation, generates first reference signals used for a physical sidelink control channel (PSCCH) and second reference signals used for a physical sidelink shared channel (PSSCH); and
a transmitter, which, in operation, transmits the first and second reference signals within a slot,
wherein the first reference signals are mapped to a first resource, and the second reference signals are mapped to a second resource which is different from the first resource,
wherein a first time interval between the first reference signals is shorter than a second time interval between the second reference signals,
wherein the PSSCH and the PSCCH are multiplexed in a frequency domain, and
wherein a preamble is transmitted in one symbol preceding the PSCCH and the PSSCH.

12. A communication method, comprising:
generating first reference signals used for a physical sidelink control channel (PSCCH) and second reference signals used for a physical sidelink shared channel (PSSCH); and
transmitting the first and second reference signals within a slot,
wherein the first reference signals are mapped to a first resource, and the second reference signals are mapped to a second resource which is different from the first resource,
wherein a first time interval between the first reference signals is shorter than a second time interval between the second reference signals,
wherein the PSSCH and the PSCCH are multiplexed in a frequency domain, and
wherein a preamble is transmitted in one symbol preceding the PSCCH and the PSSCH.

* * * * *